United States Patent
Terada

(10) Patent No.: US 8,395,979 B2
(45) Date of Patent: Mar. 12, 2013

(54) RECORDING DEVICE AND APC CORRECTION METHOD

(75) Inventor: Akio Terada, Kanagawa (JP)

(73) Assignee: Sony Corporation, Tokyo (JP)

(*) Notice: Subject to any disclaimer, the term of this patent is extended or adjusted under 35 U.S.C. 154(b) by 93 days.

(21) Appl. No.: 13/160,889

(22) Filed: Jun. 15, 2011

(65) Prior Publication Data

US 2012/0008486 A1    Jan. 12, 2012

(30) Foreign Application Priority Data

Jun. 22, 2010  (JP) ............... P2010-141364

(51) Int. Cl.
    G11B 11/00    (2006.01)
(52) U.S. Cl. ............... 369/53.27; 369/47.5
(58) Field of Classification Search .......... None
    See application file for complete search history.

(56) References Cited

U.S. PATENT DOCUMENTS

| 2007/0171794 A1* | 7/2007 | Ninomiya et al. ......... 369/47.53 |
| 2008/0192614 A1* | 8/2008 | Chang et al. ............. 369/112.23 |
| 2009/0094626 A1  | 4/2009 | Terada |

FOREIGN PATENT DOCUMENTS

JP    2009-87510    4/2009

* cited by examiner

*Primary Examiner* — Paul Huber
(74) *Attorney, Agent, or Firm* — Oblon, Spivak, McClelland, Maier & Neustadt, L.L.P.

(57) ABSTRACT

A recording device includes a light irradiation portion which irradiates an optical recording medium with laser light emitted from a light source via a field lens, a light emission drive portion which drives and causes the light source to emit light, a front monitor which receives the laser light emitted from the light source, a light receiving portion which receives reflected light which is obtained from the optical recording medium in response to the laser light irradiation, a focus servo control portion which controls a focus servo of the field lens on the basis of a light receiving signal by the light receiving portion, a surface jump controller which controls the focus servo control portion so as to perform a focus jump operation to a surface of the optical recording medium, and a surface APC corrector which performs a process as an auto power control (APC) correction process.

8 Claims, 10 Drawing Sheets

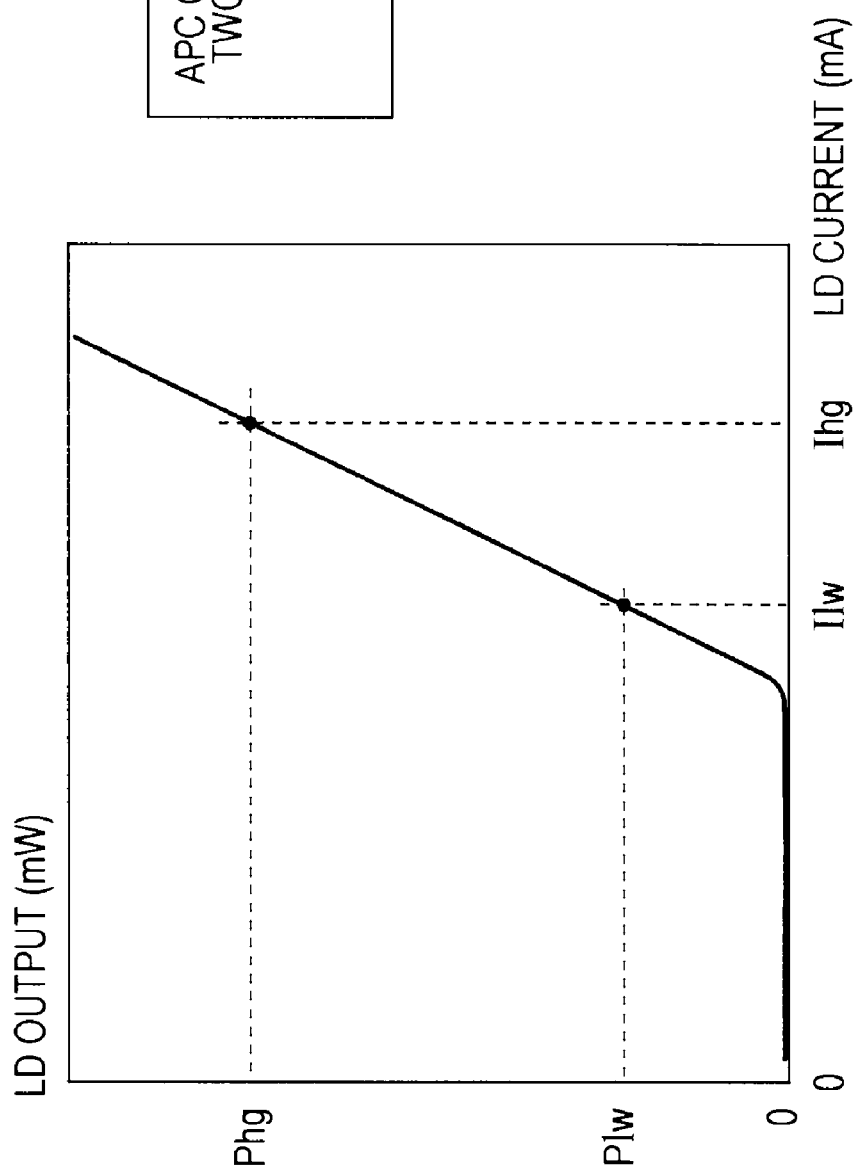

RECORDING DEVICE AND APC CORRECTION METHOD

BACKGROUND

The present disclosure relates to a recording device which performs recording on an optical recording medium, particularly, a recording device which executes an auto power control (APC) correction process which is a process of correcting the inclination of characteristics of laser output power to a laser drive current. In addition, the disclosure relates to an APC correction method as a specific method of executing the APC correction process.

As a technique for recording and reproducing digital data, there is a data recording technique using an optical disc (including a magnetic optical disc) as a recording medium, such as a compact disc (CD), a mini-disc (MD), a digital versatile disc (DVD), or a Blu-ray disc (registered trade name, BD). The optical disc collectively means disc-shaped recording mediums on which recording information is read by laser light irradiation.

The optical disc includes those known as a read-only type such as a CD, a CD-ROM, a DVD-ROM and the like, and those known as a type on which user data can be recorded such as an MD, a CD-R, a CD-RW, a DVD-R, a DVD-RW, a DVD+RW, a DVD-RAM, a BD-R, a BD-RE, and the like. Regarding the recordable type, a magneto-optical recording system, a phase change recording system, a pigmented coat change recording system, or the like is used, and thus data can be recorded.

Among these, the magneto-optical recording system and the phase change recording system are rewritable recording systems in which data rewriting can be performed, and rewritable optical discs employing the systems are in widespread use.

In addition, in the pigmented coat change recording system and the like, which are also referred to as a so-called write-once recording system, data recording can be performed once only and data rewriting is not performed. An optical disc corresponding to this write-once recording system is referred to as a write-once or recordable optical disc.

Meanwhile, video camera devices which record captured image data on an optical disc have become popular, and particularly, the present applicant proposes such a video camera device (optical disc drive device) in the field of video cameras for business use (for example, broadcasting services or the like).

Here, the optical disc drive device which is used in the field for business use has to have high reliability for a recording operation. Accordingly, higher-accuracy adjustment is performed than in drive devices for consumer use.

As an example thereof, for example, the auto power control (APC) correction process disclosed in Japanese Unexamined Patent Application Publication No. 2009-87510 can be exemplified.

The APC correction process is executed in order to suppress a fluctuation in laser power caused due to a change in slope efficiency (the inclination of characteristics of laser output power to a laser driving current) of a laser diode which is mainly caused by a change in temperature during the drive operation, and a detailed description thereof is as follows.

That is, a process for obtaining the inclination of characteristics (also referred to as IL characteristics) of laser output power to a laser driving current is executed in response to a difference in temperature from a reference point of time (for example, a point of time at which the previous APC correction process is executed) which is equal to or greater than a predetermined threshold. To obtain the inclination of the IL characteristics, first, two different levels of target laser power are set, and laser driving current values corresponding to these target laser power are obtained on the basis of the result of the adjustment of the laser driving current actually using the output of a front monitor. In this manner, when obtaining the laser driving current values corresponding to the two target laser power, the two points on the IL characteristics corresponding to a current temperature are obtained, and thus the inclination of the straight line passing through these two points is obtained to obtain the inclination of the IL characteristics.

After obtaining the inclination of the IL characteristics in this manner, a gain according to the value of the above inclination is set as a gain to be given to the laser driving current.

Here, the necessity for this APC correction process will be described with reference to FIGS. 5 to 8.

FIG. 5 shows an example of the generation of a light emission waveform.

In an optical disc drive device, in general, the light emission waveform (recording waveform) is formed of a combination of pulses corresponding to a plurality of laser power as shown in the drawing.

The example of FIG. 5 shows a case in which the recording waveform is formed of a combination of pulses corresponding to Erase power, Peak power greater than the Erase power, and Cool power less than the Erase power.

Here, in the optical disc drive device, an APC process is performed for controlling the recording power of laser light to be constant, but when the recording waveform is formed of a combination of pulses corresponding to a plurality of power as in FIG. 5, the above APC process may be performed on only one among the plurality of power. In greater detail, in the example of FIG. 5, the APC process is executed on only the Erase power.

In this case, regarding the laser driving current values (hereinafter, referred to as I_Peak and I_Cool, respectively) of the Peak power and the Cool power which are not controlled by APC to be constant, the laser driving current value I_Cool is calculated using the expression "I_Erase-α" and the laser driving current value I_Peak is calculated using the expression "β-I_Peak" as shown in the drawing on the basis of the laser driving current value (referred to as I_Erase) of the Eraser power which is controlled to be constant.

In this manner, since the laser driving current value I_Peak of the Peak power and the laser driving current value I_Cool of the Cool power are set on the basis of the laser driving current value I_Erase of the Erase power which is controlled by APC to be constant, a certain degree of the followability of the Peak power and the Cool power which are not controlled to be constant is obtained even when the IL characteristics change due to a change in temperature or the like.

However, as described above, even when using the method of obtaining the laser driving current value I_Peak of the Peak power and the laser driving current value I_Cool of the Cool power by using the fixed values α and β, respectively, on the basis of the laser driving current value I_Erase of the Erase power, it may be difficult to avoid the generation of fluctuations in the Peak power and the Cool power accompanied with a change in the IL characteristics.

FIG. 6 is a diagram showing an example of the IL characteristics, and as in the drawing, the horizontal axis represents the laser diode (LD) current (mA), and the vertical axis represents the LD output (mW).

As shown in the drawing, the IL characteristics change in accordance with a change in temperature.

As an example of the change in the IL characteristics, a change in threshold current (light emission start current) or a change in slope efficiency (η) can be illustrated.

Out of these, the slope efficiency corresponds to the inclination of the IL characteristics and is obtained by the inclination (a/b) of the straight line passing through the two points on the IL characteristics as in the drawing.

FIG. 7 shows an example of temperature characteristics of the slope efficiency. The horizontal axis represents the temperature (° C.), and the vertical axis represents the slope efficiency (η).

The temperature characteristics of the slope efficiency vary in accordance with the material for the laser diode, the design, the manufacturing process, or the like, and as shown in the drawing, different temperature characteristics are shown for each solid.

In addition, FIG. 8 shows an example of the temperature characteristics of a far-field pattern of the laser diode. The horizontal axis represents the radiation angle (°) and the vertical axis represents the relative light intensity.

As shown in this drawing, the shape of the far-field pattern of the laser diode may change in accordance with the temperature.

When the far-field pattern of the laser diode changes, depending on the design of the optical path of an optical head, coupling of the power emitted from a field lens may change by a not insignificant degree (for example, about 5%) from the power emitted from the laser diode.

That is, this also leads to a change due to the temperature of the IL characteristics.

Here, as is understood from the description of FIG. 5, the Erase power is a target of APC. Accordingly, even when the IL characteristics change, a fluctuation in the IL characteristics is prevented.

However, in the Peak power and the Cool power of which the laser driving current values are calculated by using the fixed values α and β, respectively, as described above, fluctuations are caused as shown in the following FIG. 9 with a change in the IL characteristics.

FIG. 9 illustrates a case in which the slope efficiency η changes in accordance with the temperature. When the slope efficiency η is small as in the drawing, the Peak power corresponds to P1 in the drawing and the Cool power corresponds to C1, but when the slope efficiency η is large, the Peak power corresponds to P2 and the Cool power corresponds to C2, and thus it is found that in the respective cases, a difference is generated in the Peak power and the Cool power.

In this manner, when the change in the IL characteristics (change in the slope efficiency) accompanied with the change in temperature is caused, the Erase power which is a target of APC is kept constant, but in other Peak power and Cool power which are not a target of APC, the fluctuation is caused.

As a result of the fluctuation in power, there is concern that the recording quality deteriorates.

Accordingly, it is effective to perform the APC correction process as described above.

FIG. 10 is a diagram for illustrating the APC correction process employing two-point light emission.

In the APC correction process employing two-point light emission, two levels of target laser power are set in advance. In the drawing, one of the two target laser power, of which the value is smaller is represented by "Plw", and the other is represented by "Phg".

In addition, in the APC correction process, first, laser driving current values Ilw and Ihg corresponding to these target laser power Plw and Phg are obtained. That is, these laser driving current values Ilw and Ihg are obtained on the basis of the result of monitoring the laser power which is detected on the basis of a light receiving signal obtained by the front monitor when the laser driving current value is actually changed.

Further, on the basis of the laser driving current values Ilw and Ihg which are obtained in this manner and the two target laser power Plw and Phg, the inclination of the IL characteristics (slope efficiency η) is obtained. In greater detail, the value of the inclination of the IL characteristics is obtained using the expression (Phg−Plw)/(Ihg−Ilw).

On that basis, a gain according to the value of the inclination of the IL characteristics obtained by the above calculation is set as a gain to be given to the laser driving current.

Due to the setting of the gain, the slope efficiency of the IL characteristics is corrected in accordance with the slope efficiency which is actually detected (that is, the conversion scale from the laser driving current to the laser power is corrected). As a result, also in the cases of the Peak power and the Cool power which are not a target of APC, the fluctuation resulting from the change in temperature is suppressed.

SUMMARY

However, since the APC correction process described as above is to be performed in order to suppress the deterioration in the recording quality occurring by the change in temperature during the recording operation, the APC correction process is executed mainly during the recording operation to exhibit the effect thereof.

The APC correction process during the recording operation is desirable to be performed in the vicinity of the current recording position without being moved to and performed in, for example, a test write area provided in a read-in area or the like in order to reduce the processing time.

Here, it is to be noted that the APC correction process is performed with the level of laser power changed to the vicinity of the level of recording power.

That is, in the case of a rewritable optical disc, even when the APC correction process is performed in a user data area, when the process is performed on an unrecorded portion, the recording capacity is not wasted because overwriting can be performed afterward. However, in the case of a write-once optical disc, data overwriting is not performed on the portion used for the APC correction process, and thus the recording capacity is wasted.

To prevent such a consumption of the recording capacity, moving to the test write area for each case is considered. However, much time is spent at each time of performing the APC correction process, and as a result, the recording time significantly increases.

The disclosure is contrived in view of such circumstances, and it is desirable to be able to perform the APC correction process while preventing an increase in the recording time even when a write-once optical recording medium is used.

According to an embodiment of the disclosure, there is provided a recording device including: a light irradiation portion which irradiates an optical recording medium with laser light emitted from a light source via a field lens; a light emission drive portion which drives and causes the light source to emit light; a front monitor which receives the laser light emitted from the light source; a light receiving portion which receives reflected light which is obtained from the optical recording medium in response to the laser light irradiation; a focus servo control portion which controls a focus servo of the field lens on the basis of a light receiving signal by the light receiving portion; a surface jump controller which controls the focus servo control portion so as to perform a focus jump operation to a surface of the optical recording medium in a state in which a focus servo is applied to a recording layer of the optical recording medium; and a surface APC corrector which performs a process as an auto power control (APC) correction process in a state in which a focus servo is applied to the surface due to control by the surface jump controller, and the process includes changing a value of a laser driving current which is supplied to the light source from the light emission drive portion, and obtaining a laser driving current value corresponding to each of a plurality of target laser power, and setting a gain on the basis of a plurality of the laser driving current value corresponding to each of the plurality of target laser power as a gain to be given to a laser drive signal for driving and causing the light source to emit light.

As described above, a focus jump is performed to the surface from the recording layer of an optical recording medium and the APC correction process is executed on the above surface. Accordingly, even when the level of laser power is changed to the vicinity of the level of recording power with the APC correction process, it may be difficult to perform the recording and deleting on the recording layer.

As a result, even when the optical recording medium is a write-once medium, by simply performing a very fast movement, that is, a focus jump to the surface, the APC correction process can be executed without an unnecessary consumption of the recording layer. That is, according to an embodiment of the disclosure, even when a write-once optical recording medium is used, it is possible to execute the APC correction process without a waste of the recording capacity while not performing a prolonged movement to the lead-in.

As a result, according to an embodiment of the disclosure, even when a write-once optical recording medium is used, it is possible to perform the APC correction process without causing an increase in recording time.

As described above, according to an embodiment of the disclosure, even when the level of laser power is changed to the vicinity of the level of recording power with the APC correction process, the recording or deleting on the recording layer is not performed, and even in the case of a write-once optical recording medium, the APC correction process can be performed without an unnecessary consumption of the recording layer.

In addition, to realize the APC correction process without an unnecessary consumption of the recording layer, a very fast movement, that is, a focus jump to the surface of an optical recording medium, may only be performed, and thus according to an embodiment of the disclosure, even when using a write-once optical recording medium, it is possible to perform the APC correction process without causing an increase in the recording time.

BRIEF DESCRIPTION OF THE DRAWINGS

FIG. 10 is a graph for illustrating the APC correction process employing two-point light emission.

DETAILED DESCRIPTION OF EMBODIMENTS

Hereinafter, embodiments of the disclosure will be described in the following order.
<1. Internal Configuration of Recording Device According to Embodiment>
<2. APC Correction Method According to Embodiment>
<3. Procedure of Process>
<4. Modified Examples>

1. Internal Configuration of Recording Device According to Embodiment

Figure 1:
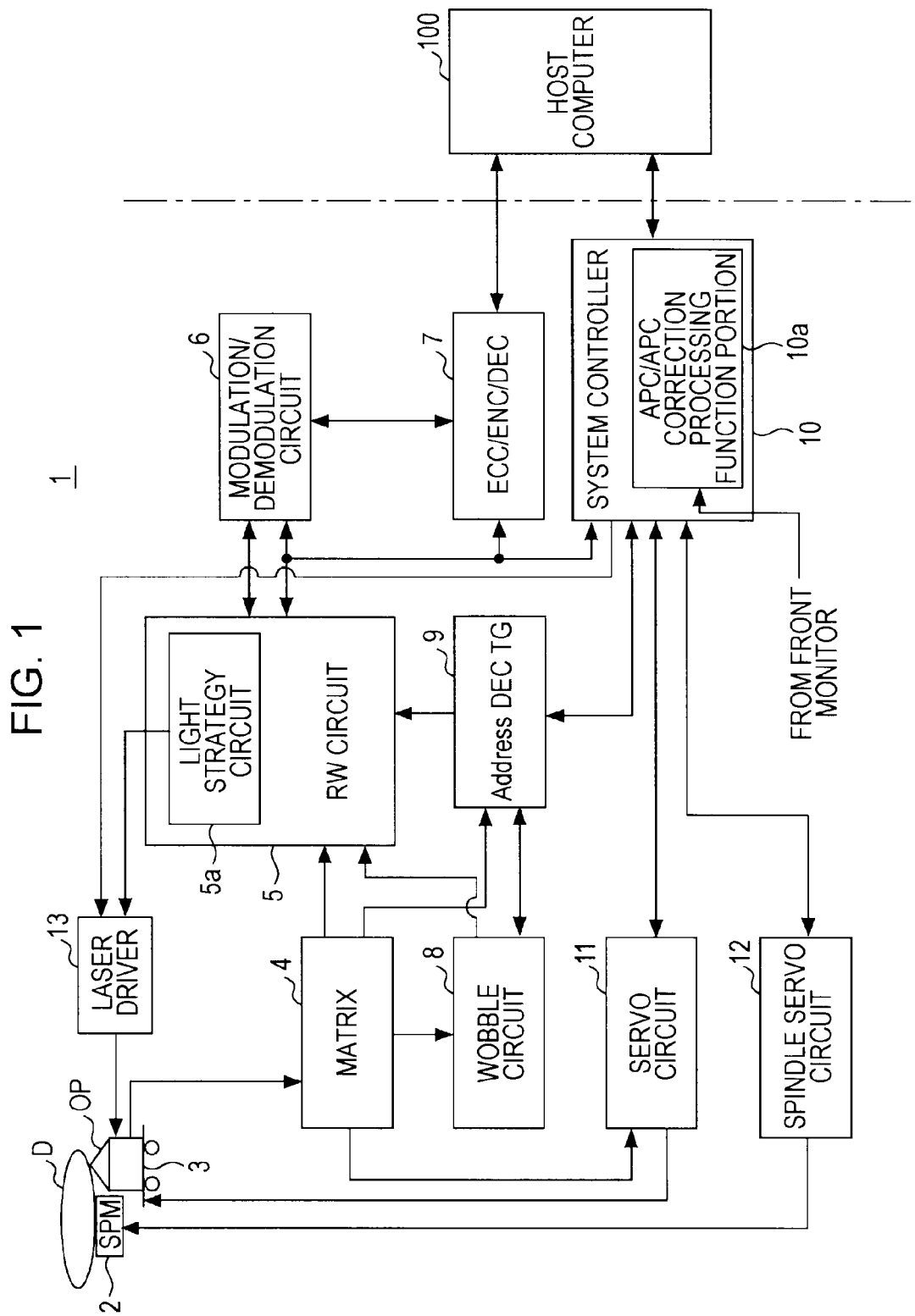
FIG. 1 is a block diagram illustrating the overall internal configuration of a recording device according to an embodiment.

FIG. 1 is a block diagram showing the overall internal configuration of a recording and reproducing device 1 according to an embodiment of the disclosure.

In FIG. 1, an optical disc D which is a recording and reproducing target of the above recording and reproducing device 1 is shown in addition to the overall internal configuration of the recording and reproducing device 1.

Here, the optical disc D has a diameter of about 120 mm and a disc thickness of about 1.2 mm as in a so-called Blu-ray disc (registered trade name, BD). The optical disc D is an optical disc on which recording and reproducing are performed under the conditions where the numerical aperture (NA) of a field lens is about 0.85 and the wavelength $\lambda$ of laser light is about 450 nm.

Here, the optical disc collectively means disc-shaped recording mediums on which recording and reproducing of signals are performed by light irradiation.

In this embodiment, the optical disc D is a write-once (recordable) optical disc on which data recording can be performed only once.

In addition, the recording and reproducing device 1 according to the embodiment is provided as a recording and reproducing portion of a video camera device which records captured image data on the optical disc D. That is, a host computer 100 shown in the drawing functions as a control portion which performs overall control of the video camera device.

In FIG. 1, the optical disc D is placed on a turntable (not shown) and is rotated at a constant linear velocity (CLV) by a spindle motor (SPM) 2 during a recording or reproducing operation.

An optical pickup (optical head) OP in the drawing reads out ADIP information, which is embedded as wobbling of a groove on the optical disc D.

In addition, when the recording is performed, the optical pickup OP records user data as a mark on a track, and when the reproducing is performed, the optical pickup OP reads out, through a mark, data which is recorded.

In the optical pickup OP, a laser diode (laser diode 15 to be described later) which is a laser light source, a photodetector for detecting reflected light, a field lens which is an output end of laser light, and an optical system which irradiates a recording surface of the optical disc D with laser light via the field lens and directs the reflected light thereof to the photodetector are formed.

In the optical pickup OP, the field lens is held to be movable in a tracking direction and in a focus direction by a biaxial mechanism.

In addition, the entire optical pickup OP is movable in a radial direction of the disc by a thread mechanism 3 in the drawing.

In addition, in the optical pickup OP, a spherical aberration mechanism for correcting the spherical aberration of laser light is provided and the spherical aberration is corrected by control of a servo circuit 11 to be described later.

In the optical pickup OP, configurations which may be necessary to execute an auto power control (APC) process or an APC correction process to be described later is also provided, but these will be described later.

The reflected light information from the optical disc D is detected by the photodetector and is converted into an electric signal according to the received light intensity to be supplied to a matrix circuit 4.

The matrix circuit 4 is provided with a current voltage conversion circuit, a matrix calculating/amplifying circuit and the like for an output current from a plurality of light receiving elements as the photodetector, and generates a signal which may be used in a matrix calculation process.

The matrix circuit 4 generates, for example, a high-frequency signal (reproduction data signal or RF signal) corresponding to reproduction data, a focus error signal for servo control, a tracking error signal, and the like.

Further, the matrix circuit 4 generates a push-pull signal as a signal relating to the wobbling of a groove, that is, a signal for detecting the wobbling (wobble amplitude).

The reproduction data signal which is output from the matrix circuit 4 is supplied to a reader/writer (RW) circuit 5. The focus error signal and the tracking error signal are supplied to the servo circuit 11, and the push-pull signal is supplied to a wobble circuit 8.

The reader/writer circuit 5 performs a binarization process on a reproduction data signal (RF signal), a reproduction clock generation process using a phase locked loop (PLL), and the like, and obtains a binary data array of signals which is recorded on the optical disc D. The binary data array is supplied to a modulation and demodulation circuit 6.

The modulation and demodulation circuit 6 functions as a decoder when the reproduction is performed, and functions as an encoder when the recording is performed.

When the reproduction is performed, the modulation and demodulation circuit 6 performs a process of demodulating a run length limited code on the basis of a reproduction clock.

When the recording is performed, an ECC encoder/decoder 7 performs an ECC encoding process of adding an error correction code, and when the reproduction is performed, the ECC encoder/decoder 7 performs an ECC decoding process of performing error correction. When the reproduction is performed, the data which is demodulated by the modulation and demodulation circuit 6 is taken in an internal memory (not shown), and an error detection/correction process, deinterleaving, and the like are performed to obtain reproduction data.

The data which is decoded up to the reproduction data by the ECC encoder/decoder 7 is read out on the basis of an instruction of a system controller 10 and is transferred to the host computer 100.

The push-pull signal which is output as a signal relating to the wobbling of a groove from the matrix circuit 4 is processed in the wobble circuit 8. The push-pull signal as ADIP information is demodulated into a data stream constituting an ADIP address in the wobble circuit 8 and is supplied to an address decoder 9.

The address decoder 9 performs decoding on data which is supplied and obtains an address value to supply the value to the system controller 10.

In addition, the address decoder 9 generates a clock in the PLL process using a wobble signal which is supplied from the wobble circuit 8, and supplies, to the respective portions, the clock as, for example, an encoding clock when the recording is performed.

When the recording is performed, recording data is transferred from the host computer 100. However, the recording data is sent to a memory in the ECC encoder/decoder 7 and buffered.

In this case, the ECC encoder/decoder 7 performs addition of an error correction code, interleaving, addition of a sub-code, or the like as a process of encoding the buffered recording data.

In addition, the ECC-encoded data is subjected to a predetermined run length limited encoding process (modulation process) employing, for example, an RLL (1-7) PP system in the modulation and demodulation circuit 6 and is supplied to the reader/writer circuit 5.

As the encoding clock which is a reference clock for these encoding processes when the recording is performed, a clock which is generated from the wobble signal is used.

The recording data generated by the encoding process is supplied to a write strategy circuit 5a in the reader/writer circuit 5.

The write strategy circuit 5a generates a light emission waveform (recording waveform) according to the recording data in accordance with various set parameters. As the parameters of the light emission waveform, there are an amplitude (power: pulse height), a pulse edge position, and the like.

The write strategy circuit 5a supplies a laser drive signal based on the generated light emission waveform to a laser driver 13.

Figure 5:
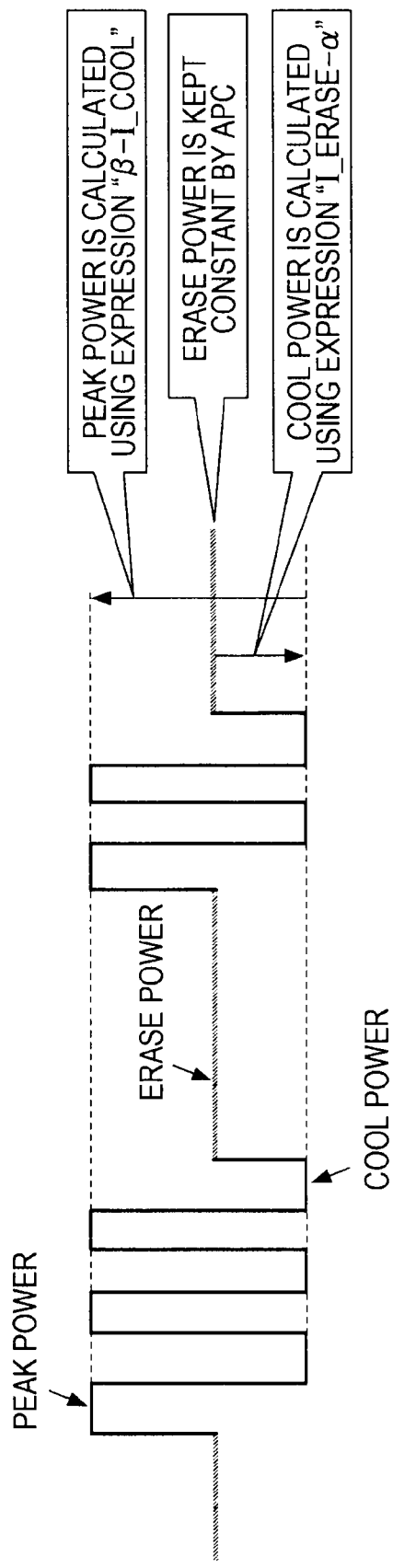
FIG. 5 is a diagram showing an example of the generation of a light emission waveform.
Figure 6:
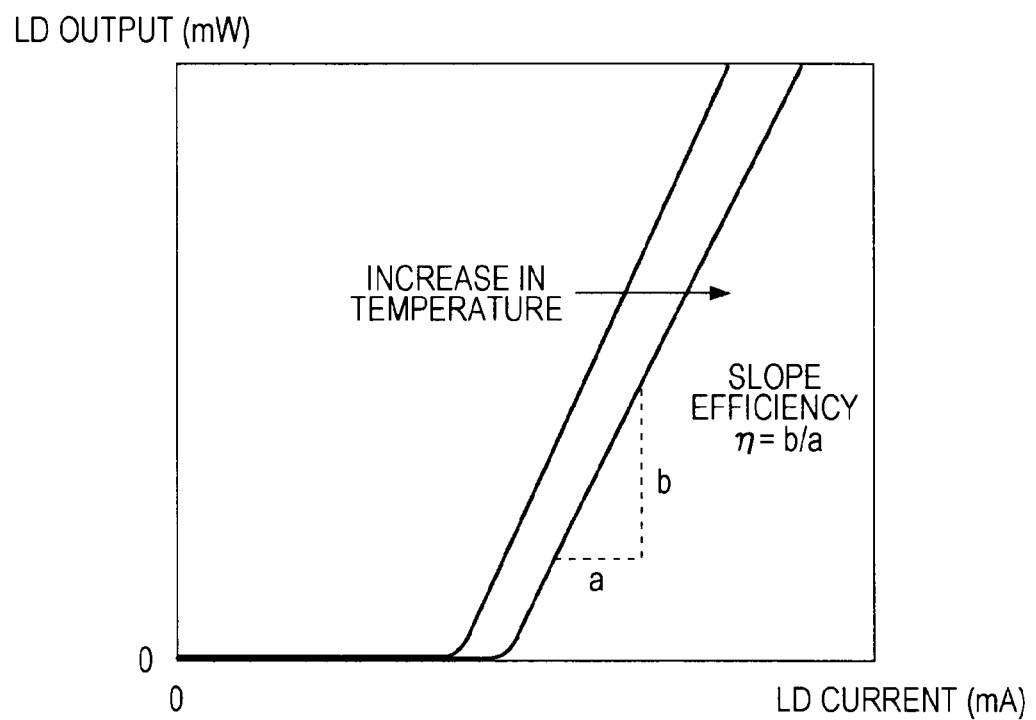
FIG. 6 is a graph showing an example of IL characteristics.
Figure 7:
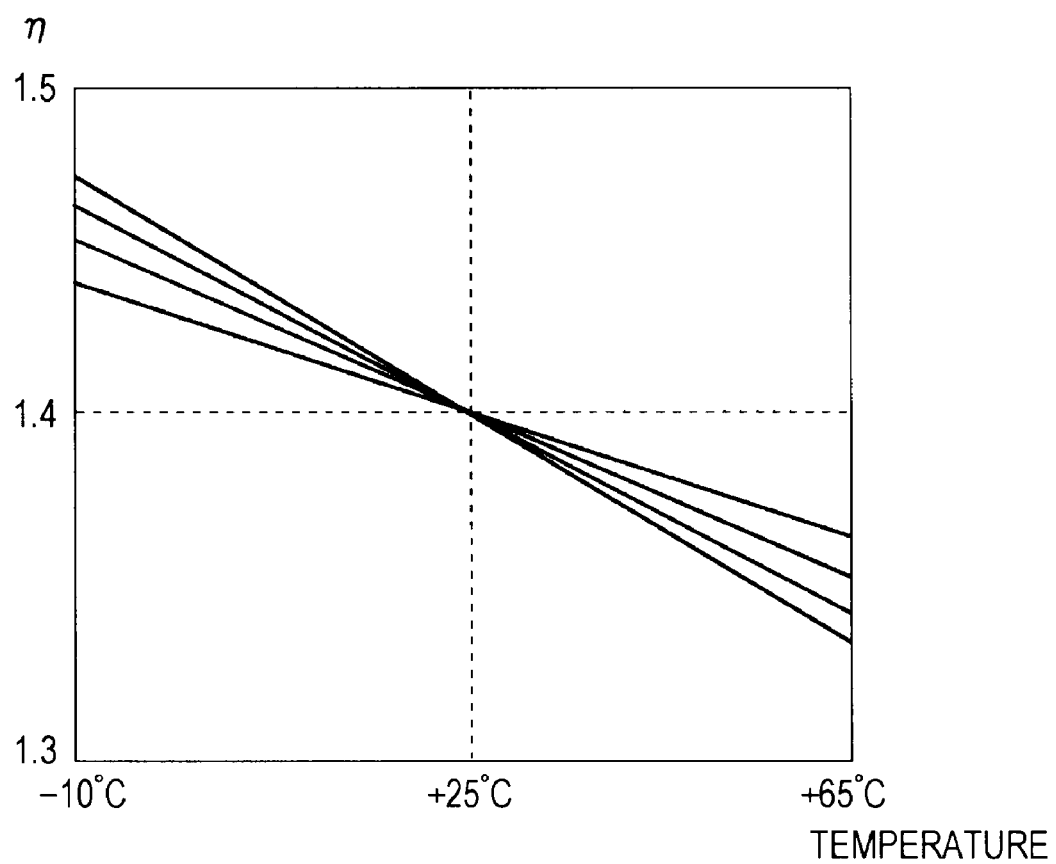
FIG. 7 is a graph showing an example of temperature characteristics of slope efficiency.
Figure 8:
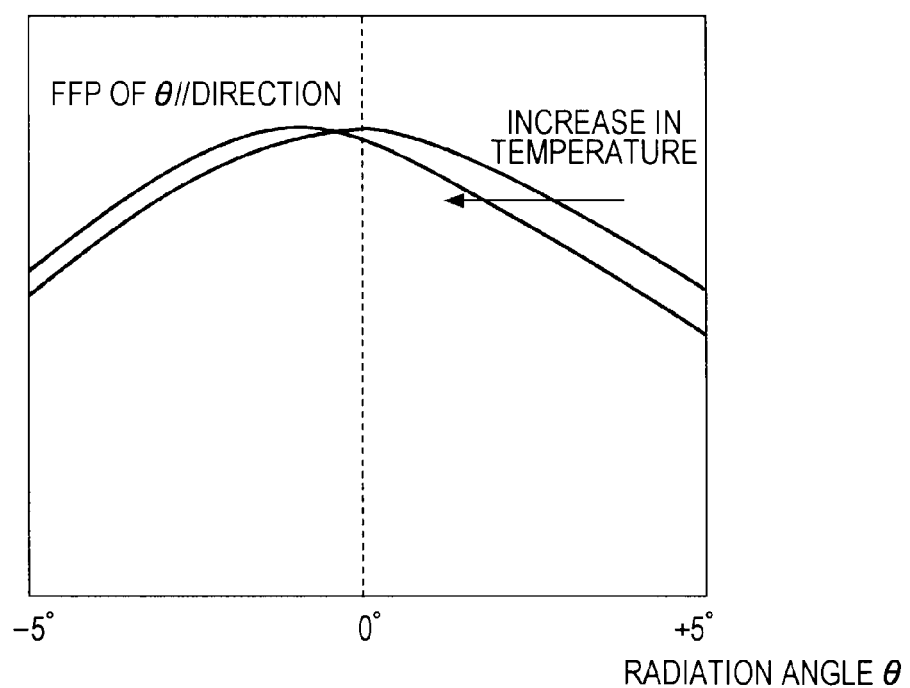
FIG. 8 is a graph showing an example of temperature characteristics of a far-field pattern of a laser diode.
Figure 9:
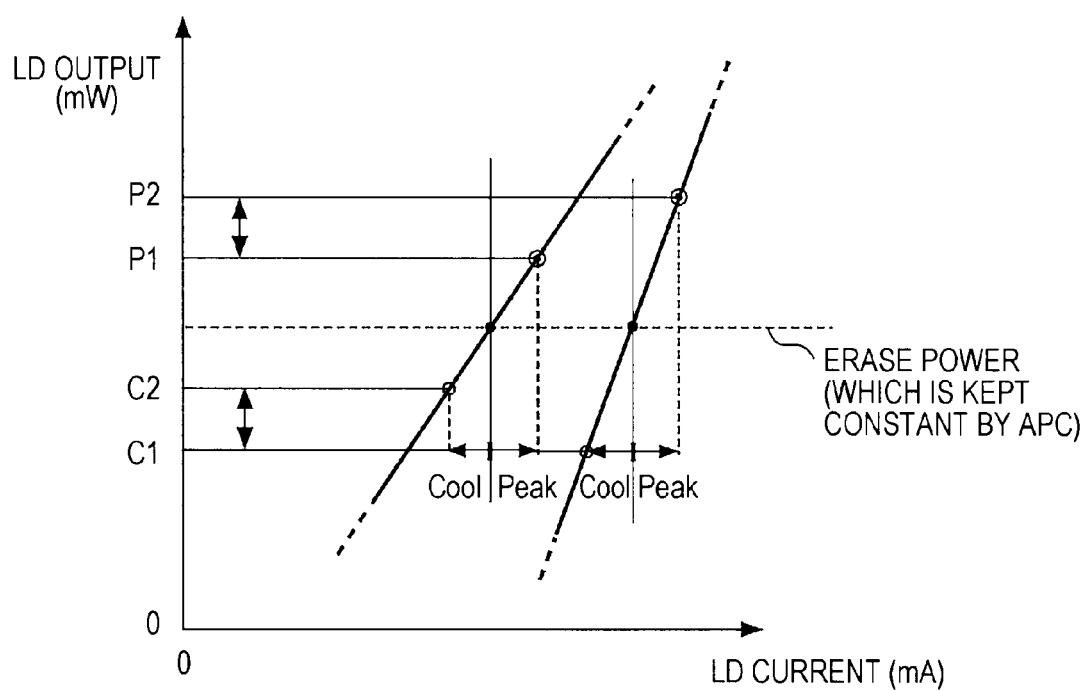
FIG. 9 is a graph for illustrating the generation of fluctuations in Peak power and Cool power with a change in IL characteristics.

Here, the write strategy circuit 5a according to this embodiment generates the light emission waveform shown in FIG. 5. That is, the write strategy circuit 5a generates a light emission waveform which is formed of a combination of pulses corresponding to a plurality of laser power.

In greater detail, also in this embodiment, a waveform is formed which is formed of a combination of pulses corresponding to Erase power, Peak power greater than the Erase power, and Cool power less than the Erase power.

In the write strategy circuit 5a, the setting of the Erase power is performed by an instruction from the system controller 10. That is, the Erase power is set (adjusted) by giving an instructed value of the pulse height of the Erase power from the system controller 10.

In addition, the write strategy circuit 5a sets the Cool power and the Peak power on the basis of the Erase power which is set in this manner. In greater detail, when a value of the pulse height of the Erase power is represented by A_Erase, a value of the pulse height of the Cool power is represented by A_Cool, and a value of the pulse height of the Peak power is represented by A_Peak, the pulse height A_Cool of the Cool power is set using the expression "A_Erase-$\alpha$" and the pulse height A_Peak of the Peak power is set using the expression "$\beta$-A_Cool", and thus the Cool power and the Peak power are set.

The above "$\alpha$" and "$\beta$" are fixed values which are set in advance.

A laser driver 13 gives a laser driving current based on a laser drive signal supplied by the write strategy circuit 5a to the laser diode 15 in the optical pickup OP in order to drive laser light emission. Accordingly, a mark according to the recording data is formed on the optical disc D.

The servo circuit 11 generates, from the focus error signal and the tracking error signal from the matrix circuit 4, various servo drive signals of focusing, tracking, and threading to execute servo operations.

That is, in accordance with the focus error signal and the tracking error signal, a focus drive signal and a tracking drive signal are generated to drive a focus coil and a tracking coil of the biaxial mechanism in the optical pickup OP. Accordingly, a tracking servo loop and a focus servo loop by the optical pickup OP, the matrix circuit 4, the servo circuit 11, and the biaxial mechanism are formed.

In addition, the servo circuit 11 turns off the tracking servo loop in accordance with a track jump command from the system controller 10 and outputs a jump drive signal to execute a track jump operation.

In addition, the servo circuit 11 generates a thread drive signal on the basis of a thread error signal which is obtained as a low-frequency component of the tracking error signal, seeks operation control from the system controller 10, or the like to drive the thread mechanism 3. Although not shown in the drawing, the thread mechanism 3 has a mechanism which includes a main shaft holding the optical pickup OP, a thread motor, a transmission gear, and the like. The thread motor is driven in accordance with the thread drive signal, and thus a sliding movement of the optical pickup OP is properly performed.

In addition, the servo circuit 11 gives a focus bias to the focus servo loop in accordance with an instruction from the system controller 10.

In addition, the servo circuit 11 gives a focus jump pulse according to an instruction from the system controller 10 into the focus servo loop, thereby realizing a focus jump operation (interlayer jump).

In addition, the servo circuit 11 supplies a drive signal for spherical aberration correction to the spherical aberration correction mechanism in the optical pickup OP in accordance with an instruction from the system controller 10.

A spindle servo circuit 12 performs control for CLV rotation of the spindle motor 2. The spindle servo circuit 12 obtains a clock, which is generated by performing a PLL process on wobble signal, as rotation velocity information of the current spindle motor 2 and compares the clock with predetermined CLV reference velocity information, thereby generating a spindle error signal.

In addition, when the data is reproduced, a reproduction clock (clock which is a reference of decoding) which is generated by PLL in the reader/writer circuit 5 becomes rotation velocity information of the current spindle motor 2. Accordingly, the spindle servo circuit 12 compares this clock with the predetermined CLV reference velocity information, thereby generating a spindle error signal. The spindle servo circuit 12 outputs a spindle drive signal which is generated in accordance with the spindle error signal to execute the CLV rotation of the spindle motor 2.

In addition, the spindle servo circuit 12 generates a spindle drive signal in accordance with a spindle kick/brake control signal from the system controller 10 to execute operations such as start-up, stop, acceleration, and deceleration of the spindle motor 2.

The above various operations of the servo system and the recording and reproducing system are controlled by the system controller 10 including a microcomputer.

The system controller 10 executes various processes in accordance with a command from the host computer 100. For example, when a writing command is issued from the host computer 100, the system controller 10 performs access execution control of an instructed address which is a target address. That is, a command is issued to the servo circuit 11 and an access operation of the optical pickup OP targeting the address which is designated by the command is executed. Further, in addition to this, by the ECC encoder/decoder 7 and the modulation and demodulation circuit 6, data (for example, various types of video data such as MPEG-2) transferred from the host computer 100 is encoded as described above. In addition, as described above, due to the supply of a laser drive signal from the reader/writer circuit 5 (write strategy circuit 5a) to the laser driver 13, recording on the optical disc D is executed.

In addition, for example, when the host computer 100 supplies a reading command to request transfer of certain data recorded on the optical disc D, first, access execution control of an instructed address which is a target is performed. After that, necessary control is performed in order to transfer the data in the instructed data section to the host computer 100. That is, the readout data from the optical disc D is subjected to decoding/buffering and the like in the reader/writer circuit 5, the modulation and demodulation circuit 6, and the ECC encoder/decoder 7, and the necessary data is transferred.

In addition, in this case, the system controller 10 executes the APC process and the APC correction process. In the drawing, the function of executing these APC process and APC correction process by the system controller 10 is blocked and shown as an APC/APC correction process function portion 10a.

Here, the APC process and the APC correction process which are executed as the APC/APC process function portion 10a by the system controller 10 will be described with reference to FIG. 2.

Figure 2:
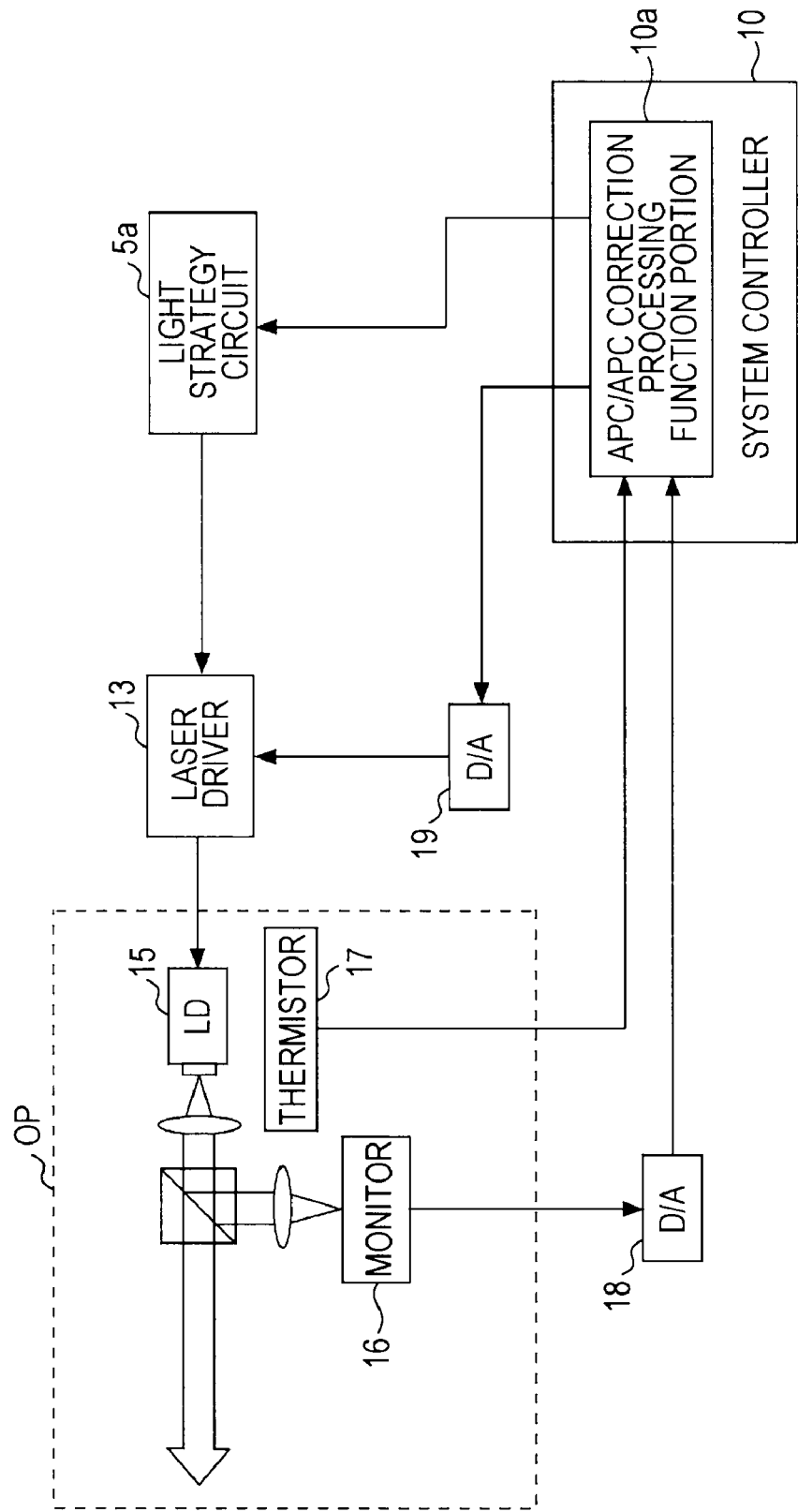
FIG. 2 is a diagram showing the configuration of a portion relating to an APC process and an APC correction process in the internal configuration of the recording device according to the embodiment.

FIG. 2 is a diagram showing the configuration of a portion relating to the APC process and the APC correction process in the internal configuration of the recording and reproducing device 1.

First, the optical pickup OP, the write strategy circuit 5a, the laser driver 13, and the system controller 10 (APC/APC correction process function portion 10a), which are shown in FIG. 1, are also shown in FIG. 2.

As shown in the drawing, in the optical pickup OP, the laser diode 15, a front monitor 16, and a thermistor 17 are provided.

As described in FIG. 1, the laser diode 15 is driven to emit light on the basis of a laser driving current which is supplied from the laser driver 13.

In addition, the thermistor 17 is provided in the vicinity of the laser diode 15 to detect the temperature in the vicinity of the laser diode 15. As in the drawing, the detected value of the temperature (temperature information) by the thermistor 17 is supplied to the system controller 10 (APC/APC correction process function portion 10a).

In addition, the front monitor 16 is provided so as to receive the laser light emitted from the laser diode 15 and a light receiving signal according to the laser output power is obtained. The light receiving signal by the front monitor 16 is supplied as laser output power information to the system controller 10 (APC/APC correction process function portion 10a) via an A/D converter 18.

APC Process

Here, the system controller 10 performs a process as the APC process so that the laser output power which is detected by the A/D converter 18 on the basis of the light receiving signal by the front monitor 16 becomes constant at the level of target laser power.

Also in this embodiment, the APC process is performed on the Erase power. In greater detail, the system controller 10 performs a process of adjusting a value (amplitude value) of the pulse height of the Erase power which is set by the write strategy circuit 5a so that the level of laser output power corresponding to the Erase power which is obtained from the A/D converter 18 becomes constant at the level of set target laser power.

APC Correction Process

In addition, the system controller 10 also executes the APC correction process in addition to the APC process. That is, the system controller 10 performs a process for obtaining the inclination of IL characteristics (characteristics of laser output power to a laser driving current) and setting a gain according to the value of the inclination as a gain to be given to the laser drive signal component as described in FIG. 10.

As is understood from the description of FIG. 10, in the APC correction process, two levels of target laser power are set in order to obtain the two points on the IL characteristics. Also in this case, one of these target laser power is represented by "Plw", and the other is represented by "Phg". The magnitude relation between these target laser power Plw and Phg is expressed as Plw<Phg.

As a specific example, in this case, the target laser power Plw is set to 4 mW and the target laser power Phg is set to 6 mW.

In the APC correction process, first, values of laser driving currents corresponding to these target laser power Plw and Phg are obtained.

Here, to obtain the values of laser driving currents corresponding to these target laser power Plw and Phg, the values of the laser driving currents are actually changed, and the values of the laser driving currents when the target laser power Plw and Phg are obtained are searched. However, in the case of this example, the laser driving currents are adjusted (controlled) by giving a laser driving current indication value Is to a D/A converter 19 in the drawing from the system controller 10. That is, by giving the laser driving current instruction value Is to the D/A converter 19 as described above, a laser driving current instruction signal (instruction voltage) according to the laser driving current instruction value Is is given to the laser driver 13, and thus the laser driving current which is given to the laser diode 15 is controlled so as to be a value according to the laser driving current instruction value Is.

While monitoring the laser output power from the A/D converter 18 (front monitor 16), the system controller 10 changes and adjusts the laser driving current instruction value Is which is given to the D/A converter 19 so that the laser output power matches the target laser power Phg. Through the adjustment, the laser driving current instruction value Is (hereinafter, a laser driving current instruction value Ishg) corresponding to the target laser power Phg is obtained.

Further, regarding the other target laser power Plw, the system controller 10 obtains a laser driving current instruction value Islw corresponding to the target laser power Plw by performing the same process.

The two points on the IL characteristics are obtained using the above-described process. That is, the two points formed by (Phg, Ishg) and (Plw, Islw), respectively, are provided (see FIG. 10).

From the two points on the IL characteristics which are obtained in this manner, the inclination (slope efficiency η) of the IL characteristics is obtained. In greater detail, (Phg−Plw)/(Ishg−Islw) is calculated.

Next, a gain according to the value of the inclination of the IL characteristics which is obtained in this manner is set as a gain to be given to a laser drive signal component. In greater detail, in this case, the gain is set to correspond to the write strategy circuit 5a so as to give the gain according to the value of the inclination of the IL characteristics to a laser drive signal which is output to the laser driver 13 from the write strategy circuit 5a.

Accordingly, the gain according to the inclination of the IL characteristics which is actually detected is given not only to the laser drive signal but also to the laser driving current which is given to the laser diode 15 which is output from the write strategy circuit 5a. This corresponds to a correction in the slope efficiency η (that is, the conversion scale from the laser driving current to the laser output power is corrected).

Accordingly, due to the setting of the gain, a fluctuation resulting from a change in temperature is suppressed also in the cases of the Peak power and the Cool power which are not a target of APC.

2. APC Correction Method According to Embodiment

Here, as described above, the APC correction process is to suppress fluctuations in the Peak power and the Cool power accompanied with a change in temperature during the recording operation, thereby preventing the deterioration in the recording quality. The APC correction process is executed during the recording operation, so that the effect thereof is exhibited. In greater detail, the APC correction process is executed every time that a difference in temperature from the time when the previous APC correction process is executed is equal to or greater than a certain level.

However, as is understood from the above description, the APC correction process is performed with the level of laser power changed to the vicinity of the level of recording power, and thus when the optical disc D is a write-once medium as in this embodiment, the recording capacity is wasted at a position where the APC correction process is executed.

At this time, when the APC correction process is moved to and executed in, for example, a test write area provided in the lead-in area or the like, a consumption of the recording capacity in the user data area is prevented. However, according to this, since a relatively prolonged movement is performed for each execution of the APC correction process during the recording operation, an undesirable result is obtained from the point of view of a reduction in recording time.

Accordingly in this embodiment, an APC correction method is proposed to prevent an increase in recording time even when using the write-once optical disc D.

In greater detail, in the APC correction method according to this embodiment, in response to a state in which a new APC correction process is to be executed in accordance with the temperature detection result during the recording operation, first, a focus jump to the surface of the optical disc D is performed. Here, the distance (that is, jump distance) from the recording layer during the recording to the surface of the optical disc D is well known from the standard of the optical disc D.

After the jump operation, the APC correction process is executed in a state in which a focus servo is applied to the surface.

A focus jump to the original recording layer is performed in response to the completion of the APC correction process. In this case, when a state before the execution of the above-described APC correction process with the surface jump is during the recording operation (during the data writing), data writing is restarted after return to the original recording layer.

In addition, the state immediately before the point of time when the APC correction process is to be executed may be during the data reading. In that case, the process is put on hold, and after the completion of the reading, the above-described APC correction process with the surface jump is executed.

To confirm, the routine in which the APC correction is performed every time that a change in temperature is equal to or greater than a certain level is continuously executed during the period from the execution of the first APC correction at the time of start-up or the like to the issuance of an operation stop instruction from the host computer 100.

According to the APC correction method of the embodiment described above, even when the level of laser power is changed to the vicinity of the level of recording power with the APC correction process, it may be difficult to perform the recording and deleting on the recording layer.

As a result, even when the optical disc D is a write-once medium, by simply performing a very fast movement, that is, a focus jump to the surface, the APC correction process can be executed without an unnecessary consumption of the recording layer. That is, according to the APC correction method of this embodiment, even when the write-once optical disc D is used, a prolonged movement to the lead-in area or the like may not be necessary, and as a result, it is possible to perform the APC correction process without causing an increase in recording time.

In addition, in the APC correction method according to the embodiment, the focus jump operation to the surface is performed from a state in which a focus servo is applied to the recording layer. In this manner, a more stabilized jump operation can be realized than in a case in which, for example, the jump operation is performed from a state in which a focus servo is released for a time.

In this manner, by performing the jump operation with the maintained servo state, the acceleration or velocity information of a laser spot (focal point) which is generated due to a surface wobble or curvature of the disc, vibration or impact is obtained from a signal which is obtained by the focus servo loop system before the jump. Accordingly, stability of the jump operation can be further increased by using these pieces of information.

In addition, as a method of avoiding consumption of the recording capacity, a method is also considered of executing the APC correction process in a state in which, for a time, the focus servo is released and the field lens is forcibly moved so as to sufficiently separate the laser spot from the recording layer. However, when this method is employed, re-pulling in of the focus servo may be necessary when returning to the original recording layer after the APC correction process, and thus time is lost. Particularly, there is concern that a long time may be necessary for re-pulling when the vibrational impact is high, and an increase in recording time due to the above reason may become large.

In the APC correction method according to this embodiment, since the focus servo is turned on even during the jump as described above, re-pulling in of the servo may not be necessary and the recording time is reduced by as much as re-pulling in is not necessary.

3. Procedure of Process

The specific procedure of a process to be executed in order to realize the APC correction method according to the embodiment described above will be described using the flowchart of FIG. 3.

In this drawing, the specific procedure of the process for realizing the APC correction method according to the embodiment is shown as the procedure of a process which is executed by the system controller 10.

The system controller 10 executes the process shown in this drawing in accordance with a program which is stored in a memory such as a ROM provided in the system controller 10.

A description shown in the drawing will be omitted. However, at least during the writing, the system controller 10 executes the above-described APC process in parallel with the series of processes shown in this drawing.

Figure 3:
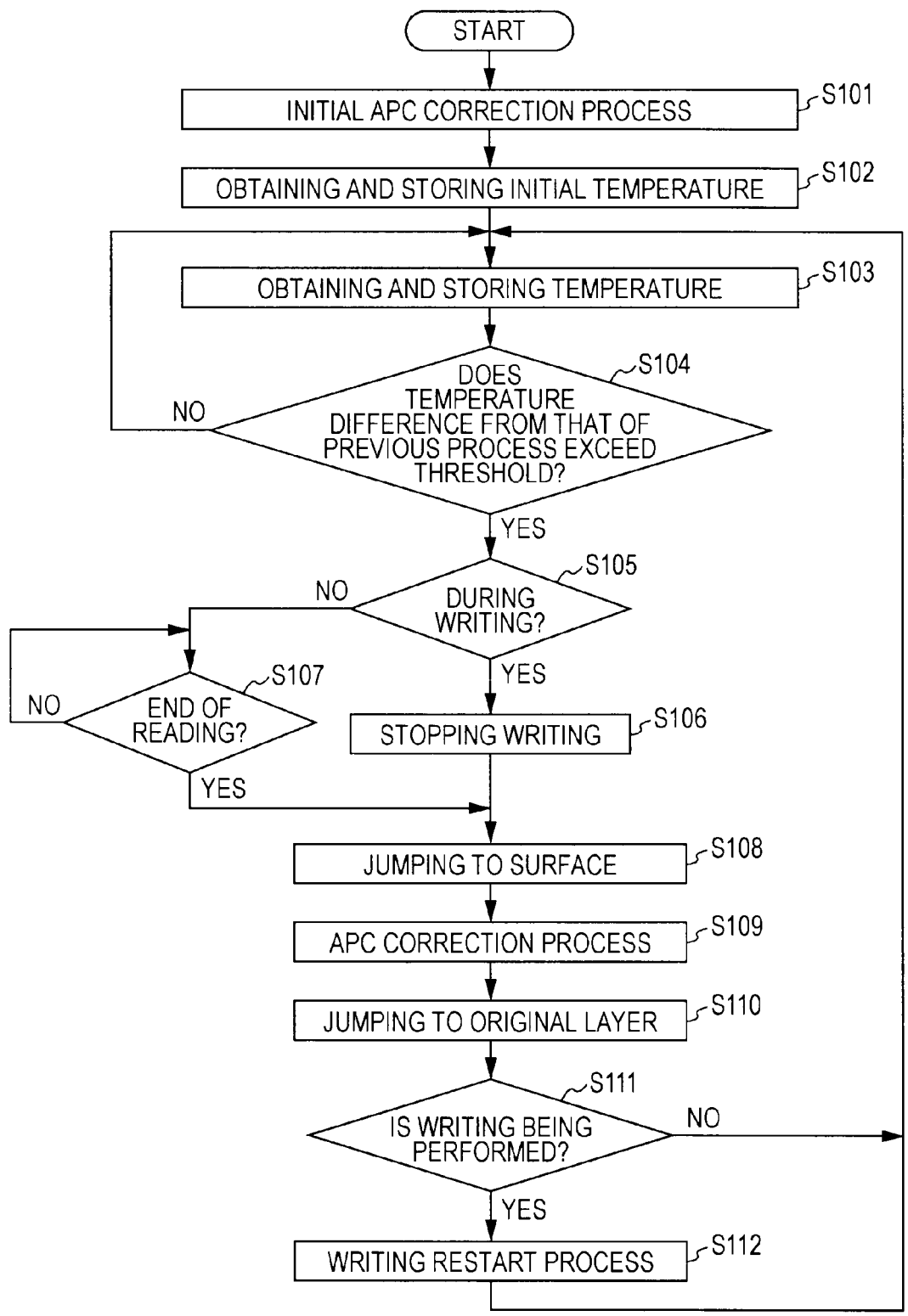
FIG. 3 is a flowchart showing the specific procedure of a process to be executed in order to realize an APC correction method according to the embodiment.

In FIG. 3, first, in Step S101, an initial APC correction process is executed.

The initial APC correction process in this Step S101 is executed at a predetermined timing, such as a start-up timing, which is set in advance for executing the initial APC correction process.

The specific processing procedure of the APC correction process which is executed by the system controller 10 will be described later in FIG. 4.

In response to the execution of the initial APC correction process by Step S101, an initial time temperature acquisition and storage process is executed in Step S102. That is, temperature information from the thermistor 17 is acquired and this is stored as initial time temperature information.

The acquisition and storage of the initial time temperature by Step S102 can also be performed before or during the execution of the initial APC correction process.

In the next Step S103, a temperature acquisition and storage process is performed, and then in Step S104, it is determined whether or not a difference in temperature from the time when the previous process is performed exceeds a threshold. That is, it is determined whether or not a temperature difference between the current temperature which is stored by the process of Step S103 and the temperature when the previous APC correction process is performed, which is stored by the past process of Step S103 or Step S102 exceeds a predetermined threshold which is set in advance. In this embodiment, a value corresponding to 5° C. (absolute value) is set as the threshold.

In Step S104, when a negative result is obtained in which the difference in temperature from the time when the previous process is performed does not exceed the threshold, the process returns to Step S103. That is, accordingly, the temperature acquisition and storage process is repeatedly executed until the difference in temperature from the time when the previous APC correction process is performed exceeds 5° C.

In Step S104, when a positive result is obtained in which the difference in temperature from the time when the previous process is performed exceeds the threshold, it is determined whether or not the writing is being performed in Step S105.

When a negative result is obtained in which the writing is not being performed (that is, when it is determined that the reading is being performed), the process proceeds to Step S107. The process is put on hold until the reading ends, and then the process proceeds to Step S108.

On the other hand, when a positive result is obtained in which the writing is being performed, the process proceeds to Step S106 to stop the writing, and then the process is advanced to Step S108.

To confirm, the unit of the writing stop/restart follows the unit (minimum recording unit) of the recording block. That is, for example, the timing at which the positive result by Step S105 is obtained is a timing at which the writing is being performed on a certain recording block, the completion of the writing on the above recording block is awaited, and then the writing is stopped. The restart (Step S112) of the writing in response to this is that the writing is started on a next recording block.

In Step S108, a process for a jump to the surface is executed. That is, an instruction is given to the servo circuit 11 to execute a focus jump to the surface of the optical disc D. As described above, the distance from the recording layer to the surface is well known, and the system controller 10 instructs, on the basis of a value which is set in advance based on the well-known distance information between the recording layer and the surface, the size of a jump pulse to be given to the focus servo loop from the servo circuit 11.

In the next Step S109, the APC correction process is executed. That is, accordingly, the APC correction process is executed in a state in which a focus servo is applied to the surface of the disc D.

After execution of the APC correction process in Step S109, a process for a jump to the original layer is performed in Step S110. That is, an instruction is given to the servo circuit 11 so as to perform a focus jump to the recording layer to which the focus servo is applied immediately before the execution of the jump by Step S108.

After execution of the jump process by Step S110, it is determined whether or not the writing is being performed in Step S111. That is, it is determined whether or not the current state is a state after the positive result is obtained in the previous Step S105.

In Step S111, when a positive result is obtained in which the writing is being performed, the process proceeds to Step S112 to execute a writing restart process, and then the process returns to the previous Step S103.

On the other hand, in Step S111, when a negative result is obtained in which the writing is not being performed, the process returns to Step S103 without change.

A description shown in the drawing will be omitted. However, the system controller 10 performs a process of determining whether or not a drive operation stop instruction from the host computer 100 is issued in parallel with a series of processes shown in this drawing, and when there is the above operation stop instruction, the series of processes shown in this drawing is ended.

As a result, a series of processes shown in FIG. 10 (that is, a process of executing the APC correction process with the surface jump every time that a difference in temperature from the time when the previous APC correction process is executed exceeds a predetermined threshold) is continuously performed during the period in which the drive is being operated.

Figure 4:
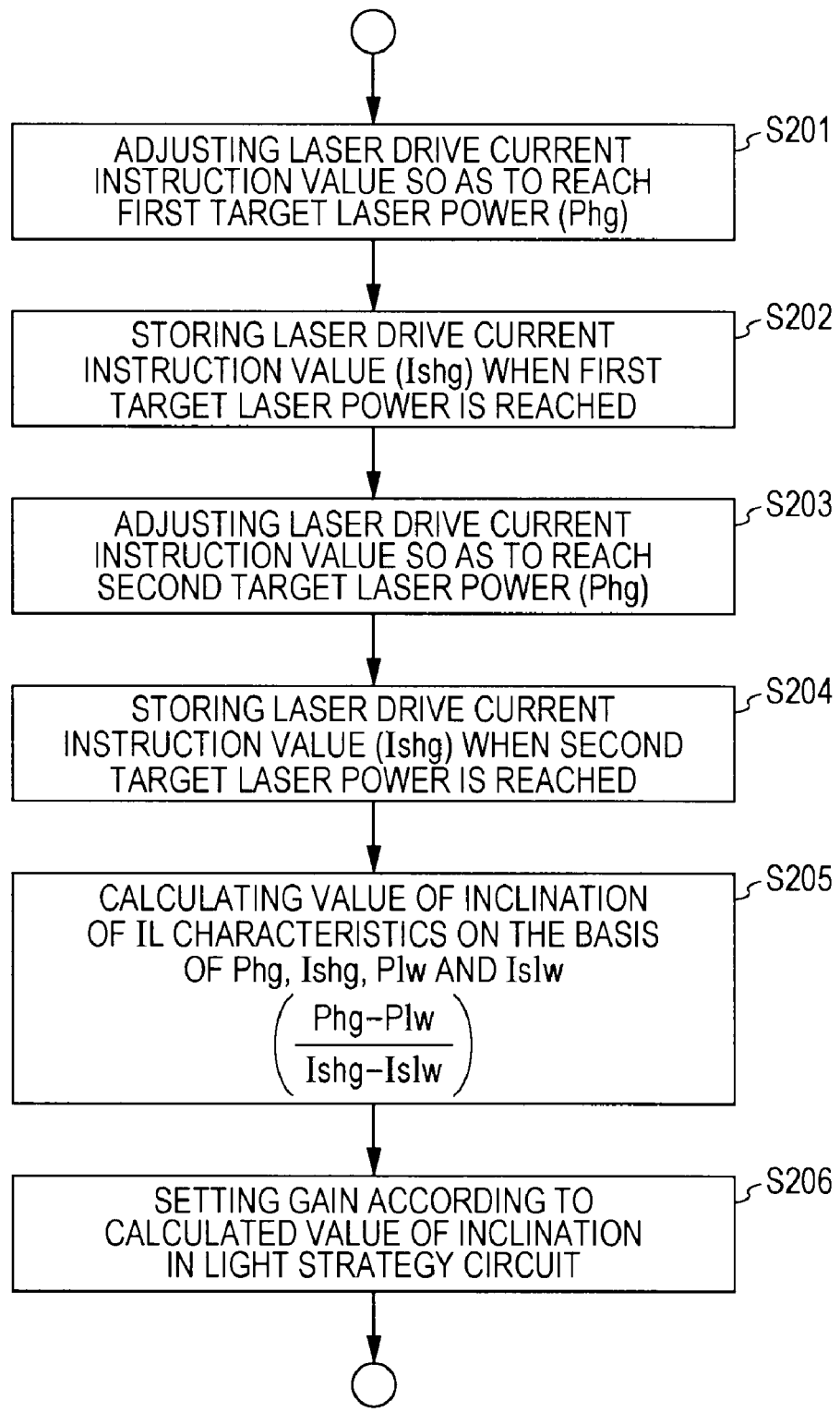
FIG. 4 is a flowchart showing the specific processing procedure of the APC correction process.

FIG. 4 is a flowchart showing the specific processing procedure of the APC correction process.

As is understood from the above description, the process shown in FIG. 4 is executed by the system controller 10.

In FIG. 4, in Step S201, the laser driving current instruction value Is is adjusted so that the first target laser power (Phg) is reached.

That is, as described above, while the laser driving current instruction value Is which is given to the D/A converter 19 is changed, the laser output power from the A/D converter 18 (front monitor 16) is monitored and the laser driving current instruction value Is is adjusted so that the laser output power matches the above target laser power Phg.

In the next Step S202, the laser driving current instruction value Is (laser driving current instruction value Ishg) when the first target laser power Phg is reached is stored.

In addition, in the next Step S203, the laser driving current instruction value Is is adjusted so that second target laser power (Plw) is reached. In the next Step S204, the laser driving current instruction value Is (laser driving current instruction value Islw) when the second target laser power Plw is reached is stored.

After execution of the storage process by Step S204, the value of the inclination of the IL characteristics is calculated on the basis of Phg, Ishg, Plw, and Islw in Step S205. In greater detail, (Phg−Plw)/(Ishg−Islw) is calculated.

After that, in Step S206, a gain according to the calculated value of the inclination is set in the write strategy circuit 5a. That is, the gain is set to correspond to the write strategy circuit 5a so as to give the gain to a laser drive signal which is output to the laser driver 13.

4. Modified Examples

As described above, the embodiments of the disclosure have been described. However, the disclosure is not limited to the specific examples which have been described.

For example, in the above description, the description has been performed on the assumption that a focus servo misalignment does not occur after the surface jump. However, on the assumption that a focus servo misalignment on the surface occurs, after the focus jump to the surface, the APC correction process may be stopped on the basis of a light receiving signal which is obtained by a photodetector receiving the reflected light from the optical disc D.

In greater detail, a pull-in signal (sum signal: RF signal) or a focus error signal FE after the surface jump is monitored and the APC correction process is stopped in accordance with a predetermined change generated in these.

For example, it is determined whether or not the level of a pull-in signal after the surface jump is reduced to be equal to or lower than a predetermined level, and when the level is equal to or lower than the predetermined level, the APC correction process can be stopped.

Otherwise, it is determined whether or not the level of a focus error signal FE after the surface jump is equal to or higher than a predetermined level, and when the level is equal to or higher than the predetermined level, the APC correction process can be stopped.

In these cases, the pull-in signal and the focus error signal FE are input to the system controller 10 from the matrix circuit 4. The system controller 10 performs the above determinations and stops the APC correction process in accordance with the result thereof.

Otherwise, a circuit which performs determination based on the pull-in signal and the focus error signal FE is separately provided, and the system controller 10 stops the APC correction process in accordance with a signal indicating the result of the determination from the circuit.

When the APC correction process is stopped on the basis of a light receiving signal after the jump as described above, occurrence of data corruption or a waste of the recording capacity in the event of a focus servo misalignment after the jump can be effectively prevented.

In addition, in the above description, the pulse which is given when the surface jump is performed depends on the fixed value according to the distance between the recording layer and the surface which is set by the standard. However, for example, from a signal (focus error signal FE or focus drive signal) in the focus servo loop, acceleration or information about the movement velocity of the laser spot is detected and the jump pulse can be adjusted on the basis of these pieces of information. Accordingly, a more stabilized jump operation to the surface can be performed.

In addition, in the above description, the description has been performed on the assumption that the optical disc D is a single-layer disc having only one recording layer. However, the disclosure can also be preferably applied to a double layer disc having two recording layers or a multilayer disc having three or more recording layers.

Here, in the case of a single layer disc, the level of a focus error signal FE which is obtained at the time of surface focusing is relatively lower than the level of a focus error signal FE which is obtained at the time of a recording layer focusing in comparison to the cases of a double layer disc and a multilayer disc. Accordingly, when the mounted optical disc D is a single layer disc, the gain of the focus error signal FE may be raised at the timing at which the surface jump is executed (or at a predetermined timing before or after the timing). In this manner, it is possible to reduce a possibility of a focus servo misalignment when the surface jump is performed or thereafter.

In addition, in the case of a multilayer disc, the range of the laser output power when the recording is performed extends. Accordingly, in response to this, the number of light emission points when the APC correction process is performed can be increased to three-point light emission, four-point light emission, or the like from the two-point light emission illustrated in the embodiment.

In addition, in the above description, the APC process is executed by the system controller 10. However, the APC process can also be executed by an APC circuit which is separately provided.

Similarly, also in the case of the APC correction process, a separate circuit which executes the APC correction process is provided, and the system controller 10 issues a surface jump instruction to the servo circuit 11, and then issues an instruction to the above circuit so as to execute the APC correction process.

In addition, in the above description, the case has been illustrated in which in the APC correction process, the gain according to the value of the inclination of the IL characteristics is given to a laser drive signal which is output to the laser driver 13 from the write strategy circuit 5a. However, the above-described gain may be given to a laser drive signal component for driving and causing the laser diode 15 to emit light (that is, the gain may be given so as to be reflected to a laser driving current), and, of course, it can also be directly given to a laser driving current which is generated by the laser driver 13.

In addition, in the above description, the case has been illustrated in which the recording device according to the embodiment of the disclosure is applied to a drive (recording and reproducing portion) of a video camera device. However, according to the embodiment of the disclosure, the recording device can also be appropriately applied to other devices other than the video camera device.

In addition, in the above description, the case has been illustrated in which the recording and the reproducing on the optical disc D are performed under the same optical conditions as in the case of a BD. However, the disclosure can also be preferably applied to other optical recording mediums such as a CD or a DVD.

In addition, in the above description, the case has been illustrated in which the recording device according to the embodiment of the disclosure is applied to a recording and reproducing device also having a function of reproducing an optical recording medium. However, the recording device according to the embodiment of the disclosure can also be preferably applied to a recording-only device not having the above-described reproducing function.

The present disclosure contains subject matter related to that disclosed in Japanese Priority Patent Application JP 2010-141364 filed in the Japan Patent Office on Jun. 22, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
    a light irradiation portion which irradiates an optical recording medium with laser light emitted from a light source via a field lens;
    a light emission drive portion which drives and causes the light source to emit light;
    a front monitor which receives the laser light emitted from the light source;
    a light receiving portion which receives reflected light which is obtained from the optical recording medium in response to the laser light irradiation;
    a focus servo control portion which controls a focus servo of the field lens on the basis of a light receiving signal by the light receiving portion;
    a surface jump controller which controls the focus servo control portion so as to perform a focus jump operation to a surface of the optical recording medium in a state in which a focus servo is applied to a recording layer of the optical recording medium; and
    a surface APC corrector which performs a process as an auto power control (APC) correction process in a state in which a focus servo is applied to the surface due to control by the surface jump controller, wherein the process includes
        changing a value of a laser driving current which is supplied to the light source from the light emission drive portion, and obtaining a laser driving current value corresponding to each of a plurality of target laser power, and
        setting a gain on the basis of a plurality of the laser driving current value corresponding to each of the plurality of target laser power as a gain to be given to a laser drive signal for driving and causing the light source to emit light.

2. The recording device according to claim 1, further comprising:
    a return jump controller which controls the focus servo control portion so as to execute a focus jump operation to the recording layer formed in the optical recording medium after execution of the APC correction process by the surface APC corrector.

3. The recording device according to claim 1, further comprising:
    an APC correction stopper which stops the APC correction process of the surface APC corrector on the basis of the light receiving signal which is obtained after execution of the jump operation to the surface by control of the surface jump controller.

4. The recording device according to claim 3,
    wherein the APC correction stopper stops the APC correction process on the basis of the level of a signal which is obtained on the basis of the light receiving signal.

5. The recording device according to claim 4,
    wherein the APC correction stopper stops the APC correction process on the basis of a result of determination whether or not the level of a sum signal which is obtained on the basis of the light receiving signal is equal to or less than a predetermined level.

6. The recording device according to claim 4,
wherein the APC correction stopper stops the APC correction process on the basis of a result of determination whether or not the level of an absolute value of a focus error signal which is obtained on the basis of the light receiving signal is equal to or greater than a predetermined level.

7. The recording device according to claim 1,
wherein the light emission drive portion drives and causes the light source to emit light by a laser driving current based on a recording waveform formed of a combination of pulses respectively corresponding to a plurality of laser power, and includes an APC mechanism which executes an APC process of controlling the light emission drive portion so as to control the level of predetermined laser power among the plurality of laser power to be constant, and
the light emission drive portion sets a laser drive signal value corresponding to laser power other than the laser power, which is controlled to be constant by the APC process, among the plurality of laser power on the basis of a laser drive signal value corresponding to the laser power which is controlled to be constant by the APC process.

8. An auto power control (APC) correction method in a recording device including a light irradiation portion which irradiates an optical recording medium with laser light emitted from a light source via a field lens, a light emission drive portion which drives and causes the light source to emit light, a front monitor which receives the laser light emitted from the light source, a light receiving portion which receives reflected light which is obtained from the optical recording medium in response to the laser light irradiation, and a focus servo control portion which controls a focus servo of the field lens on the basis of a light receiving signal by the light receiving portion, the method comprising:
    controlling the focus servo control portion so as to perform a focus jump operation to a surface of the optical recording medium in a state in which a focus servo is applied to a recording layer of the optical recording medium; and
    performing a process as an APC correction process in a state in which a focus servo is applied to the surface due to control by the control of the focus servo control portion, wherein the process includes
        changing a value of a laser driving current which is supplied to the light source from the light emission drive portion, and obtaining a laser driving current value corresponding to each of a plurality of target laser power, and
        setting a gain on the basis of a plurality of the laser driving current value corresponding to each of the plurality of target laser power as a gain to be given to a laser drive signal for driving and causing the light source to emit light.

* * * * *